United States Patent
Kuwabara et al.

(10) Patent No.: US 7,786,058 B2
(45) Date of Patent: Aug. 31, 2010

(54) ROLLING DEVICE EMPLOYING LUBRICATING GREASE COMPOSITION AND ELECTRIC POWER STEERING APPARATUS EMPLOYING THE ROLLING DEVICE

(75) Inventors: Hirofumi Kuwabara, Osaka (JP); Shigeyuki Sugimori, Osaka (JP); Toshihiro Asakura, Osaka (JP)

(73) Assignee: JTEKT Corporation, Osaka-shi (JP)

( * ) Notice: Subject to any disclaimer, the term of this patent is extended or adjusted under 35 U.S.C. 154(b) by 21 days.

(21) Appl. No.: 11/912,953

(22) PCT Filed: Apr. 27, 2006

(86) PCT No.: PCT/JP2006/308867
§ 371 (c)(1),
(2), (4) Date: Oct. 29, 2007

(87) PCT Pub. No.: WO2006/118208
PCT Pub. Date: Nov. 9, 2006

(65) Prior Publication Data
US 2009/0065287 A1    Mar. 12, 2009

(30) Foreign Application Priority Data
Apr. 28, 2005 (JP) ............................ 2005-131702

(51) Int. Cl.
*C10M 135/18* (2006.01)
*C10M 169/06* (2006.01)
*C10M 115/08* (2006.01)
*B62D 5/04* (2006.01)

(52) U.S. Cl. .................. 508/363; 508/168; 508/159; 508/552; 180/444

(58) Field of Classification Search .............. 508/363, 508/168, 159, 552; 180/444
See application file for complete search history.

(56) References Cited

U.S. PATENT DOCUMENTS

| 4,749,502 | A  | * | 6/1988  | Alexander et al. | 508/539 |
| 4,859,352 | A  | * | 8/1989  | Waynick | 508/174 |
| 6,444,621 | B1 | * | 9/2002  | Okaniwa et al. | 508/168 |
| 2004/0198617 | A1 | * | 10/2004 | Kinoshita et al. | 508/527 |
| 2004/0224859 | A1 | * | 11/2004 | Numazawa et al. | 508/364 |
| 2005/0020456 | A1 | * | 1/2005  | Kawamura et al. | 508/364 |

FOREIGN PATENT DOCUMENTS

| JP | 2001 49274  | 2/2001 |
| JP | 2001 64665  | 3/2001 |
| JP | 2003 155491 | 5/2003 |
| JP | 2004 59604  | 2/2004 |
| JP | 2004 204218 | 7/2004 |
| WO | 03 006590   | 1/2003 |

* cited by examiner

*Primary Examiner*—Glenn A Caldarola
*Assistant Examiner*—Vishal Vasisth
(74) *Attorney, Agent, or Firm*—Oblon, Spivak, McClelland, Maier & Neustadt, L.L.P.

(57) ABSTRACT

A rolling device employing a lubricating grease composition containing a thickener which is a mixture of (a) one or more diurea compounds made from one or more primary amines and a diisocyanate; (b) at least one fatty acid metal salt; (c) at least one amide compound selected from the group consisting of aliphatic amides and bisamides, where the proportions of (a), (b) and (c) satisfy the relationship: a/(b+c)=0.2–10 provided that (1) the proportion of ingredient (a) is 1-10, (2) the proportion of ingredient (b) is 0.5-2.5, and (3) the proportion of ingredient (c) is 0.5-2.5, and the amount of the thickener is 2 to 30% by weight, based on the lubricating grease composition; (d) a base oil which is a lube base oil having a pour point of −36 to −67.7° C. that includes a synthetic hydrocarbon oil as the main component; and (e) 1-7% by weight of an additive mixture containing an organomolybdenum complex, an organozinc compound of a dithiocarbamic acid, and an organozinc compound of dithiophosphoric acid.

15 Claims, No Drawings

ROLLING DEVICE EMPLOYING LUBRICATING GREASE COMPOSITION AND ELECTRIC POWER STEERING APPARATUS EMPLOYING THE ROLLING DEVICE

This application is a 371 application of PCT/JP2006/308867, filed Apr. 27, 2006 which claims benefit to application number JP 2005-131702, filed Apr. 28, 2005.

TECHNICAL FIELD

The present invention relates to a rolling device employing a lubricating grease composition which considerably diminishes irregular friction fluctuations occurring on rolling/sliding friction surfaces, shows stable low-torque characteristics in a wide temperature range, can retain a sufficient oil film even at high temperatures, has a long life, and contains a novel thickener. The invention further relates to an electric power steering apparatus employing the rolling device.

BACKGROUND ART

In recent years, the automobile industry is growing remarkably and the desired values of performances of individual automotive parts separately constituted including greases increase steadily year by year. To provide a new technique is always required.

Especially in electric power steering apparatus for motor vehicles, technical innovations are remarkable. The apparatus, which at first were employed in solar cars and part of light cars, have recently come to be mounted in an exceedingly wide range from small passenger cars to large passenger cars. In this field, the number of cars equipped with the apparatus doubles year by year.

Electric power steering apparatus for motor vehicles are explained below in detail. The automotive power steering apparatus mainly used at present are of the hydraulic type. In the case of the hydraulic type, however, it is necessary to directly take a measure not to cause an environmental problem because a hydraulic fluid (power steering fluid) is used. In addition, since the hydraulic pump for generating a hydraulic pressure is operated by a power from the engine and is always operated (even when the steering wheel is not manipulated), use of the hydraulic apparatus is accompanied by an engine power loss. This is a cause of impairment of fuel efficiency.

On the other hand, in the case of an electric power steering apparatus, an electric motor is used as a power source for power assist. It is sufficient to drive the electric motor with a controller only when power assist is necessary. Furthermore, since the electric motor is driven by the electricity generated during car running, the engine power loss is extremely small and the effect of saving fuel cost is high. Consequently, the amount of energy consumption also can be far smaller than in the hydraulic type.

However, the electric power steering apparatus presently in use are still inferior in output power to hydraulic power steering apparatus. It is hence important to improve the ability of the electric motor and to minimize the friction of individual constituent parts and thereby minimize the burden to be imposed on the motor.

Furthermore, in electric power steering apparatus, low-temperature starting is regarded as important especially in cold districts. The reasons for this are as follows. In the case of hydraulic power steering apparatus, engine warming-up has an effect that the heat source of the hydraulic pump, which is directly connected to the engine, warms up each part of the steering apparatus using the hydraulic oil as a heat medium. Because of this, a lubricant having general low-temperature characteristics has sufficed for the hydraulic steering apparatus. In the case of electric power steering apparatus, however, the steering apparatus is not readily warmed up because of the absence of a direct heat source from the engine.

Consequently, it is essential that the greases to be used in parts for the apparatus should be ones which attain stable friction torque properties at low temperatures.

Motor vehicles are used all over the world. Electric power steering apparatus also are hence designed and produced while taking account of common use in environments ranging from an extremely cold environment of about −40° C. to a red-heat environment of 100° C. or higher [(outside air temperature)+(radiant heat in engine room)+(radiant heat from road surface)]. There is a desire for a grease which has stable low-torque characteristics in a wide temperature range from a low temperature to a high temperature, does not suffer the oil film deficiency caused by a viscosity decrease at high temperatures, and has a long life corresponding to the life of the vehicle.

Furthermore, there recently are rapidly increasing trends toward the active incorporation of subtle and delicate behaviors according to natural laws, such as the vibrations, fluctuations, and fuzzy movements which are sensed by men, into automotive parts and toward an offer of more comfortable and stable handling and a more comfortable interior space. New techniques have rapidly come to be desired.

Electric power steering apparatus are steering apparatus which will be mainly used in the future in place of the hydraulic steering apparatus and, hence, are progressing in an innovational manner. Under these circumstances, the introduction of unconventional new ideas and techniques is remarkable. One of important subjects is to evolve subtle feelings sensed by men, such as those described above, in a more comfortable direction. This tendency is exceedingly strong especially in high-class passenger cars.

A specific example of such feelings related to the invention is as follows. In the case where a car is running straight on a straight highway, the steering apparatus is in a load-free state and, hence, the electric motor which operates steering is in the state of being stopped and giving no assist. In this situation, the driver's hands gripping the steering wheel are not in a completely stationary state. The tires are moving little by little because of road surface undulations, etc. and the steering wheel, which receives such subtle vibrations and movements, subtly swings in the leftward/rightward directions. The driver's hands gripping the steering wheel sense these subtle movements, and the driver is continuously in the state of driving the car while manipulating the steering wheel little by little in the leftward/rightward directions.

In this period of subtle manipulation, electric assist is not given. Consequently, the subtle feelings given to the driver's hands are attributable to the direct transmission of frictions generated at individual parts constituting the steering system. (In the case where the steering wheel is manipulated and electric assist is given, the frictions generated at the individual parts are countervailed by the power of electric assist and are hence difficult to be transmitted to the driver's hands.)

Examples of the frictions thus occurring at individual parts constituting the steering mechanism include frictions at the following parts which are shown in the FIG. 2 given in patent document 1: the sliding parts of the sealed bearings 33 and 34; the contact part between the teeth of the rack shaft 15 and the teeth of the pinion shaft 22; and the sliding part between either the ball screw groove 15b or the ball screw groove 38A and the ball bearing 39 interposed between these grooves.

When such frictions at the sliding parts of individual parts fluctuate irregularly, there is a high possibility that these fluctuations are directly transmitted to the driver's hands grasping the steering wheel and are sensed as an unpleasant feeling. Although the irregular fluctuations of friction occurring here practically exert no influence on steering wheel manipulation, the subtle feeling given to men is a serious problem in cars of the kind for which exceedingly high quality and ultimate comfortableness are pursued, such as high-class passenger cars.

In the case of ball screw devices having the same mechanism as the ball screw structure in the electric power steering apparatus described above, the ball screw devices are generally employed mainly in machine tools. However, the mechanism of the rolling/sliding of balls is almost the same and use of general lubricating greases is apt to result in friction fluctuations at the sliding part between the balls and a screw part. In case where irregular friction fluctuations have occurred, processing accuracy decreases and higher quality cannot be imparted to the work.

There are many documents on rolling devices, electric power steering apparatus, and lubricants for the apparatus. However, there is no document on a rolling device which discloses an electric power steering apparatus in which the technique concerning a grease composition according to that patent document is used to diminish the subtle unpleasant feeling given to men and thereby enable more comfortable manipulation and which further discloses a technique for inhibiting the irregular friction fluctuations.

For example, documents on rolling devices concerning lubrication include patent documents 2 to 5.

Patent document 2 discloses a technique for prolonging the lubrication life of a high-load ball screw to be incorporated into the injection drive shaft or mold clamping mechanism driving part of an injection molding machine of the electrically operated type or into an electric press, bender, or the like. In this technique, a grease containing a urea compound, an organonickel compound, and an organomolybdenum compound and having a 100,000-time worked consistency as measured in accordance with JIS K-2220 of 280 or higher is enclosed to thereby inhibit the balls of the ball screw from being marred and thereby attain life prolongation. Although the urea compound shown in this patent document and part of the additives shown therein closely resemble part of the grease composition of the present invention, the grease composition disclosed in that document basically differs from the grease composition of the invention and utterly differs in the effect obtained.

Patent document 3 discloses a grease for the ball screw in the driving apparatus of an electrically operated injection molding machine. This grease comprises a urea compound as a thickener and a mineral oil or synthetic oil having a viscosity at 40° C. of 300 mm$^2$/s or higher as a base oil, and is characterized by having a consistency of 300 or higher. The technique disclosed is intended to prevent early damage. Although part of the urea compound thickener shown in the patent document closely resembles part of the grease composition of the invention, the grease composition disclosed therein basically differs from the grease composition of the invention and utterly differs in the effect obtained.

Patent document 4 discloses a technique concerning a lubricating grease for lubricating the lubrication passageways of a ball screw in which a screw groove has been formed in each of the outer peripheral surface of the screw shaft and the inner peripheral surface of the nut. This lubricating grease has a lightness of 1 or higher and has a composition obtained by incorporating additives including an organomolybdenum compound into a lubricating grease prepared by thickening a base oil having a viscosity at 100° C. of 3.0-7.5 mm$^2$/s with a urea compound thickener. The effects of this technique are as follows. Since the lubricating grease enclosed has a lightness of 1 or higher, the lubricating grease changes to black upon deterioration and decreases in lightness to below 1. Consequently, the timing of greasing can be easily noticed. Furthermore, the use of a urea compound thickener in combination with a base oil having a viscosity at 100° C. of 3.0-7.5 mm$^2$/s enables the lubricating grease to be smoothly supplied to the friction surfaces to thereby improve the durability of the ball screw. Although part of the urea compound thickener and part of the additives in the grease composition disclosed in the patent document closely resemble part of the grease composition of the invention, the grease composition disclosed therein basically differs from the grease composition of the invention and utterly differs in the effect obtained.

Patent document 5 discloses a technique concerning a method of lubricating a ball screw with a lubricating oil which comprises a poly($\alpha$-olefin) oil, an alkylbenzene oil, and an ethylene/propylene oligomer as a base oil and contains an extreme-pressure agent such as an ash-free thiocarbamate compound, hydroxymolybdenum dithiocarbamate sulfide, or the like and which has a dynamic viscosity at 40° C. of 10-460 mm$^2$/s. This technique is for preventing the abnormal wearing and seizing of a ball screw by diminishing frictional heat in the sliding part or removing wearing dust and foreign matters. The lubricant disclosed in the patent document is a lubricating oil and intrinsically differs from the grease composition of the invention. This lubricating oil utterly differs in the effect thereof to the technique of the invention.

There also are patent documents 6 to 11 as documents on an electric power steering apparatus and a lubricant for the apparatus.

Patent document 6 describes a grease composition for automotive steering mechanisms which comprises (a) thickener, (b) a base oil having a pour point of −40° C. or lower, (c) an organomolybdenum compound, (d) melamine cyanurate, (e) polytetrafluoroethylene, and (f) molybdenum disulfide. There is a statement therein to the effect that the grease composition for automotive steering mechanisms exhibits adequate lubricity in a gear toothing part especially in a rack-and-pinion part, the hypoid gears of a pinion-assisted electric power steering mechanism, or the like. However, the makeup of this grease composition utterly differs from that of the grease composition of the invention.

Patent document 7 describes an electric power steering apparatus employing as a lubricant a grease which has improved long-lasting high-temperature lubricity while retaining intact low-starting-torque characteristics at low temperatures. There is a statement therein to the effect that the grease comprises a base oil which is a synthetic hydrocarbon oil, a thickener selected from lithium composite soaps and urea compounds, and a lubricity improver selected from solid lubricants and oily substances. There also is a statement therein to the effect that the electric power steering apparatus is a power steering apparatus which has an electric motor for generating steering assist power and a speed reducer serving to reduce a rotation speed by means of a gear mechanism connected to the rotation shaft of the motor and in which at least one of the reduction gears of the gear mechanism is made of a synthetic resin and this synthetic-resin gear is lubricated with a grease. With respect to the grease composition, a claim includes the term urea compound thickener. This grease composition is coincident in this point only. However, details of the makeup of the composition and an effect are not shown at all.

Patent document 8 describes a lubricating grease composition which comprises a base oil and a thickener and in which a fluororesin powder has been added to the base oil. There is a statement therein to the effect that this grease composition is used in e.g., the speed reducer of an electric power steering apparatus.

Patent document 9 describes a lubricating grease composition which comprises a base oil and a thickener and in which the thickener comprises a combination of lithium stearate and lithium hydroxystearate. There is a statement therein to the effect that this grease composition is used in, e.g., the speed reducer of an electric power steering apparatus.

That speed reducer of an electric power steering apparatus which is described in patent document 8 and patent document 9 and the specific part therein to be lubricated are, for example, a speed reducer employing a worm wheel made of a synthetic resin, such as a polyamide resin. There is a statement therein to the effect that the role of a lubricating grease composition contributing to friction reduction in the part to be lubricated in the sliding part (friction surfaces) between the worm wheel made of a synthetic resin and the worm shaft made of a metal is important. However, this grease composition utterly differs from the grease composition of the invention.

Patent document 10 describes a grease composition for resin lubrication obtained by incorporating montan wax into a grease comprising a thickener and a base oil. There is a statement therein to the effect that the grease composition is for the speed reducer of an electric power steering apparatus and the specific part to be lubricated therewith is the speed reduction mechanism part including a worm wheel gear made of a resin (polyamide) and a worm gear made of steel. With respect to the grease composition, a claim includes the term urea compound thickener. This grease composition is coincident in this point only. However, this grease composition utterly differs from the grease composition of the invention as apparent from the facts that it contains montan wax as an essential ingredient and that it is a grease composition for resin lubrication.

Patent document 11 describes a lubricating grease composition which comprises a base oil and a thickener and in which a polyethylene oxide wax has been incorporated. There is a statement therein to the effect that the grease composition is used for, e.g., the speed reducer of an electric power steering apparatus. The speed reducer of an electric power steering apparatus is a speed reducer comprising a worm wheel made of a synthetic resin and a worm shaft made of a metal, and the specific part to be lubricated with the grease composition is the friction surfaces of this speed reducer. However, this grease composition utterly differs from the grease composition of the invention.

Patent document 12 discloses an electric power steering apparatus in which the assist power of an electric motor is transmitted to the steering mechanism of a motor vehicle through a speed reduction gear mechanism. This electric power steering apparatus is characterized in that the follower gear of the speed reduction gear mechanism comprises a metallic core pipe and, integrally formed on the outer periphery of the pipe, a resinous part made of a resin composition and having gear teeth formed in the periphery thereof and that the speed reduction gear mechanism is lubricated with a grease composition which contains a wax having a polar group introduced in the molecular structure thereof and employs a thickener such as a diurea compound. In this apparatus, the sliding lubrication of the interface between the resinous member and a metallic member, which is the sliding part of the speed reduction gear mechanism, is satisfactorily maintained over long to thereby give an excellent steering feeling. Although part of the diurea compound and part of the additive ingredients in the grease composition disclosed in the patent document closely resemble part of the grease composition of the invention, the grease composition disclosed therein basically differs from the grease composition of the invention. In addition, the electric power steering apparatus utterly differs in constituent parts and friction mechanism.

The electric power steering apparatus according to the invention is an apparatus shown in the accompanying drawings in patent document 1, i.e., a rack-assisted electric power steering apparatus constituted of a ball screw mechanism 37 and rolling bearings 33 and 34. This apparatus gives power assist in the shaft directions based on the ball screw connected to the rack shaft. Because this ball screw mechanism closely resembles the ball screw mechanisms mounted in machine tools and the like, the lithium grease frequently employed in these machine tools has been used as the lubricating grease for that part.

The rack-assisted electric power steering apparatus disclosed in patent document 1 is one in which the electric motor has been disposed coaxially with the rack shaft. However, there also are the type in which the electric motor has been disposed not coaxially but parallel with the rack shaft (e.g., patent document 13) and the type in which the electric motor has been disposed so that the shaft axis thereof intersects that of the rack shaft (e.g., patent document 14). In these types, the electric motor is connected to the ball screw mechanism (ball screw nut) through a transmission device such as a gear mechanism or a belt.

However, as the electric power steering apparatus improve in assist power, durability, and stable low-torque characteristics and remarkably progress in other various performances with the increasing desire for the mounting of the apparatus in motor vehicles, the lubricating greases according to prior-art techniques have become unable to enable the steering apparatus to sufficiently exhibit stable steering characteristics at temperatures ranging from a high to a low temperature and have a satisfactory durability life. In addition, the prior-art lubricating greases have had a problem concerning low-torque characteristics in lower-temperature environments.

The "rolling bearing" employed in each of the electric power steering apparatus described above mainly is a deep-groove ball bearing having one or more grooves (see, for example, patent document 15).

The "electric power steering apparatus" according to the invention should not be construed as being limited to those described above, and can be one such as those described in, e.g., patent document 13 and patent document 14. In the former case, the ball screw mechanism 2 and each ball bearing described in the document correspond to the "rolling bearing" and, in particular, the bearings 8 and 10 which movably support the nut part 2a correspond to the "ball bearing which utilizes the rolling of balls". In the latter case, the ball screw mechanism 9 (19, 29) and each ball bearing described in the document correspond to the "rolling bearing" and, in particular, the bearing 10 (20) which movably supports the nut part 9a (19a, 29a) corresponds to the "ball bearing which utilizes the rolling of balls".

The rolling device is a rolling device utilizing the rolling of balls, and rolling devices having any ball screw mechanism are included therein.

The present inventors made thorough investigations on constituent parts of the electric power steering apparatus described especially in patent document 1 as to which parts are apt to give a subtle unpleasant feeling to men. As a result, they found that constituent parts suffering rolling/sliding friction, such as the sealed bearings 33 and 34 and the sliding part between either the ball screw groove 15b or the ball screw groove 38A and the ball bearing 39 interposed between these grooves, are apt to undergo irregular friction fluctuations. It was further found that the degree of these irregular friction fluctuations is considerably influenced by the difference of the lubricating grease. The inventors made further intensive investigations. As a result, they have found that the lubricating grease composition of the invention can greatly reduce the irregular friction fluctuations occurring at those constituent parts and is an extremely stable lubricating grease composition which does not give an unpleasant feeling to the driver at all. Based on these findings, the inventors have succeeded in providing a rolling device and an electric power steering apparatus each containing the lubricating composition.

Patent Document 1: JP-A-2003-335249

Patent Document 2: JP-A-2000-303089

Patent Document 3: JP-A-2001-49274

Patent Document 4: JP-A-2001-304307

Patent Document 5: JP-A-2002-340132

Patent Document 6: JP-A-2001-64665

Patent Document 7: JP-A-2002-308125

Patent Document 8: JP-A-2002-363589

Patent Document 9: JP-A-2002-363590

Patent Document 10: JP-A-2002-371290

Patent Document 11: JP-A-2003-3185

Patent Document 12: JP-A-2004-301268

Patent Document 13: JP-A-2004-114972

Patent Document 14: JP-A-2004-122858

Patent Document 15: JP-A-2004-144118

DISCLOSURE OF THE INVENTION

Problems that the Invention is to Solve

The invention relates to a rolling device employing a lubricating grease composition which considerably diminishes irregular friction fluctuations occurring on rolling/sliding friction surfaces, shows stable low-torque characteristics in a wide temperature range, can retain a sufficient oil film even at high temperatures, has a long life, and comprises a novel thickener, a specific base oil, and additive ingredients. The invention further relates to an electric power steering apparatus.

Means for Solving the Problems

The present inventors made thorough investigations on the sliding parts of rolling devices in electric power steering apparatus. As a result, they found that constituent parts which suffer rolling/sliding friction come into the state of being apt to undergo irregular friction fluctuations depending on the difference of the lubricating grease. The inventors made further intensive investigations. As a result, it has been found that when a lubricating grease composition comprising a novel thickener, a specific base oil, and additive ingredients is applied to a rolling device, then a rolling device having a long life is obtained which can be considerably reduced in irregular friction fluctuations, shows stable low-torque characteristics in a wide temperature range, and can retain a sufficient oil film even at high temperatures. Furthermore, it has been found that a high-performance electric power steering apparatus is obtained by employing this rolling device. The invention has been thus achieved.

Namely, the invention, in a first aspect, relates to a rolling device characterized by employing a lubricating grease composition comprising:

a thickener which is a mixed thickener comprising a mixture of:

(a) one or more diurea compounds which are one or more aliphatic diurea compounds having an average molecular weight of 500-750 in which 10-70% by mole of the linear hydrocarbon groups are unsaturated components, the aliphatic diurea compounds having been produced using as a raw material one or more primary amines having a total amine value in the range of 200-400, (b) at least one fatty acid metal salt, and (c) at least one amide compound selected from the group consisting of aliphatic amides and aliphatic bisamides represented by formulae (I) and (II):

$$R_1CONH_2 \qquad (I)$$

$$R_1CONHR_2NHCOR_1 \qquad (II)$$

(wherein $R_1$ represents a saturated or unsaturated alkyl group having 15-17 carbon atoms and $R_2$ represents a methylene group or an ethylene group), the proportions of (a) and of (b) and (c) satisfying the relationship:

$$a/(b+c)=0.2-10$$

provided that (1) the proportion of ingredient (a) is 1-10, (2) the proportion of ingredient (b) is 0.5-2.5, and (3) the proportion of ingredient (c) is 0.5-2.5, the amount of the thickener being 2-30% by weight based on the whole composition;

(d) a base oil which is a lube base oil having a pour point of −25° C. or lower and comprising a synthetic hydrocarbon oil as the main component; and (e) an additive which is a mixture comprising an organomolybdenum complex, an organozinc compound of a dithiocarbamic acid, and an organozinc compound of a dithiophosphoric acid, the amount of the additive being 1-7% by weight, based on the whole composition.

The invention, in a second aspect, relates to the rolling device of claim 1 characterized in that the rolling device is a ball screw mechanism.

The invention, in a third aspect, relates to the rolling device of claim 1 characterized in that the rolling device is a rolling bearing.

The invention, in a fourth aspect, relates to the rolling device of claim 3 characterized in that the rolling bearing is a ball bearing which utilizes the rolling of balls.

The invention, in a fifth aspect, relates to an electric power steering apparatus characterized by employing the rolling device of any one of claims 1 to 4.

In the invention, in case where the average molecular weight of the thickener (a) is lower than 500 and in case where the average molecular weight thereof exceeds 750, optimal grease intervention is not obtained in the device and stable torque characteristics are not sufficiently obtained.

In case where the proportion of unsaturated components in the linear hydrocarbon groups is lower than 10% by mole, a proper oiliness effect is not obtained in the device and stable torque characteristics are not sufficiently obtained. In case where the proportion thereof exceeds 70% by mole, it is difficult to secure sufficient heat resistance in the device and life shortening is expected. Furthermore, in case where the total amine value of the primary amines is outside the range of 200-400, it is difficult to obtain optimal grease intervention, a proper oiliness effect, and sufficient heat resistance in the device. In this case, it is expected that stable torque characteristics are not sufficiently obtained and the life is shortened.

The fatty acid metal salt as ingredient (b) is, for example, a salt formed by reacting a linear, saturated or unsaturated, aliphatic monocarboxylic acid having 6-24 carbon atoms (the acid may contain one hydroxyl group), such as lauric acid, myristic acid, palmitic acid, stearic acid, 12-hydroxystearic acid, arachic acid, behenic acid, lignoceric acid, oleic acid, linoleic acid, linolenic acid, or ricinoleic acid, with a metal such as lithium, sodium, magnesium, aluminum, calcium, zinc, or barium. Especially preferred are fatty acid metal salts which are the lithium, magnesium, aluminum, calcium, or zinc salts of saturated or unsaturated aliphatic monocarboxylic acids having 12-18 carbon atoms.

The at least one amide compound as ingredient (c) is a compound obtained by reacting a fatty acid with an amine, and comprises a mixture of at least one amide compound selected from the group consisting of aliphatic amides and aliphatic bisamides represented by formulae (I) and (II):

$$R_1CONH_2 \quad (I)$$

$$R_1CONHR_2NHCOR_1 \quad (II)$$

(wherein $R_1$ represents a saturated or unsaturated alkyl group having 15-17 carbon atoms and $R_2$ represents a methylene group or an ethylene group). Examples thereof include N,N'-ethylenebisstearamide, N,N'-methylenebisstearamide, stearamide, and oleamide.

Examples of the synthetic hydrocarbon oil to be used as or in ingredient (d) in the invention include poly α-olefins, polybutenes, and ethylene/α-olefin co-oligomers. These hydrocarbon oils exhibit an optimal effect in the device when they each have a pour point of −25° C. or lower. In case where a lubricating oil having a pour point higher than −25° C. is used in a grease, this grease itself has enhanced viscoelasticity and given low-temperature torque characteristics cannot be obtained in the device.

Although the base oil for use in the grease composition comprises any of those synthetic hydrocarbon oils as the main component, the synthetic hydrocarbon oils have the following and other excellent features. These oils have a low pour point and can retain flowability even at low temperatures. They have satisfactory oxidative stability and excellent viscosity/temperature characteristics (high VI). Because of this, even at high temperatures, the oils decrease little in viscosity and can retain a stable oil film. In addition, those oils do not exert adverse influences, e.g., swelling, on members made of synthetic rubbers, synthetic resins, etc.

A mineral oil, synthetic ester oil, synthetic polyglycol oil, synthetic silicone oil, synthetic fluorochemical oil, or the like can be used as part of the base oil for use in the grease composition in the device. However, these oils are unsuitable for use as a main component. In case where a mineral oil is used as a major component of the base oil, this base oil is insufficient in low-temperature characteristics and heat resistance. In case where a synthetic ester oil is used, there is a fear that it may exert adverse influences on synthetic rubbers and synthetic resins, such as swelling the rubbers or resins or reducing the hardness thereof. Synthetic polyglycol oils are inferior in heat resistance or lubricity to synthetic hydrocarbon oils.

Furthermore, synthetic silicone oils are less apt to give satisfactory lubricity although excellent in heat resistance. Synthetic fluorochemical oils have a poor affinity for the thickener and are highly expensive although exceedingly excellent in heat resistance. The term main component used with regard to (d) means that the synthetic hydrocarbon oil having a pour point of −25° C. or lower accounts for 80% by weight or more of the lubricating oil.

The organomolybdenum complex as a component of ingredient (e) in the invention means the organomolybdenum complex described in JP-B-5-66435. Examples of the organozinc compound of a dithiocarbamic acid include zinc dithiocarbamates such as zinc diethyldithiocarbamate sulfide, zinc dipropyldithiocarbamate sulfide, zinc dibutyldithiocarbamate sulfide, zinc dipentyldithiocarbamate sulfide, zinc dihexyldithiocarbamate sulfide, zinc didecyldithiocarbamate sulfide, zinc diisobutyldithiocarbamate sulfide, zinc di(2-ethylhexyl)dithiocarbamate sulfide, zinc diamyldithiocarbamate sulfide, zinc dilauryldithiocarbamate sulfide, zinc distearyldithiocarbamate sulfide, zinc diphenyldithiocarbamate sulfide, zinc ditolyldithiocarbamate sulfide, zinc dixylyldithiocarbamate sulfide, zinc diethylphenyldithiocarbamate sulfide, zinc dipropylphenyldithiocarbamate sulfide, zinc dibutylphenyldithiocarbamate sulfide, zinc dipentylphenyldithiocarbamate sulfide, zinc dihexylphenyldithiocarbamate sulfide, zinc diheptylphenyldithiocarbamate sulfide, zinc dioctylphenyldithiocarbamate sulfide, zinc dinonylphenyldithiocarbamate sulfide, zinc didecylphenyldithiocarbamate sulfide, zinc didodecylphenyldithiocarbamate sulfide, zinc ditetradecylphenyldithiocarbamate sulfide, and zinc dihexadecylphenyldithiocarbamate sulfide. Examples of the organozinc compound of dithiophosphoric acid include zinc diethyldithiophosphate sulfide, zinc dipropyldithiophosphate sulfide, zinc dibutyldithiophosphate sulfide, zinc dipentyldithiophosphate sulfide, zinc dihexyldithiophosphate sulfide, zinc didecyldithiophosphate sulfide, zinc diisobutyldithiophosphate sulfide, zinc di(2-ethylhexyl)dithiophosphate sulfide, zinc diamyldithiophosphate sulfide, zinc dilauryldithiophosphate sulfide, zinc distearyldithiophosphate sulfide, zinc diphenyldithiophosphate sulfide, zinc ditolyldithiophosphate sulfide, zinc dixylyldithiophosphate sulfide, zinc diethylphenyldithiophosphate sulfide, zinc dipropylphenyldithiophosphate sulfide, zinc dibutylphenyldithiophosphate sulfide, zinc dipentylphenyldithiophosphate sulfide, zinc dihexylphenyldithiophosphate sulfide, zinc diheptylphenyldithiophosphate sulfide, zinc dioctylphenyldithiophosphate sulfide, zinc dinonylphenyldithiophosphate sulfide, zinc didecylphenyldithiophosphate sulfide, zinc didodecylphenyldithiophosphate sulfide, zinc ditetradecylphenyldithiophosphate sulfide, and zinc dihexadecylphenyldithiophosphate sulfide.

In the invention, the proportions of (a) and of (b) and (c) satisfy the relationship:

$$a/(b+c)=0.2-10$$

provided that (1) the proportion of ingredient (a) is 1-10, (2) the proportion of ingredient (b) is 0.5-2.5, and (3) the proportion of ingredient (c) is 0.5-2.5.

In case where a/(b+c) is smaller than 0.2, the proportion of the diurea ingredient is small and desired heat resistance is not obtained. In case where a/(b+c) exceeds 10, the effect of diminishing friction fluctuations is not sufficiently obtained in the device.

In case where the proportion of ingredient (a) is smaller than 1.0, which correlates to the relationship a/(b+c), the proportion of the diurea ingredient is small, resulting in insufficiency of desired heat resistance. In case where the proportion thereof exceeds 10, the effect of diminishing friction fluctuations is not sufficiently obtained in the device.

Furthermore, in case where the proportions of ingredient (b) and ingredient (c) each is smaller than 0.5, the effect of diminishing friction fluctuations is not sufficiently obtained in the device in this case also. When the proportions thereof exceed 2.5, the effect of diminishing friction fluctuations is not very improved for such large amounts of the fatty acid metal salt and amide compound. In this case, torque increases rather than decreases, and insufficient heat resistance results because of the small diurea ingredient proportion.

In case where the amount of the whole thickener mixed is smaller than 2% by weight, the grease is too soft and there is a fear about leakage, etc. In case where the amount thereof is larger than 30% by weight, the grease is too hard and has increased flow resistance, resulting in a considerable increase in torque and an increased cost.

In case where the proportion of the synthetic hydrocarbon oil ingredient in ingredient (d) is smaller than 80% by weight, a stable low torque is not obtained throughout the range from ordinary temperature to a low temperature.

The content of ingredient (e) is 1-7% by weight, preferably 1.5-6% by weight, more preferably 2-5% by weight, based on the whole composition.

In case where the content of ingredient (e) is lower than 1% by weight based on the whole composition, the device does not have a given durability life. When the content thereof is higher than 7% by weight, no remarkable effect is obtained, resulting only in an increased cost.

Advantages of the Invention

The invention has succeeded in providing a rolling device and an electric power steering apparatus which each employ as a lubricant a long-life lubricating grease composition which considerably diminishes irregular friction fluctuations occurring on rolling/sliding friction surfaces, shows stable low-torque characteristics in a wide temperature range, can retain a sufficient oil film even at high temperatures, and contains a novel thickener.

EXAMPLES

The invention will be explained below in detail by reference to Examples and Comparative Examples, but the invention should not be construed as being limited by these Examples in any way.

Examples 1 to 4

Grease samples were produced according to the formulations shown in Table 1.

The method used is as follows. The base oil and the diisocyanate were charged into a closed type grease sample production apparatus. The contents were heated to 60° C. with stirring, and a raw material prepared by mixing the amines with the base oil and dissolving these was added to the contents through a hopper and reacted therewith. The reaction mixture was heated to 170° C. with stirring and held for 30 minutes to complete the reaction. Thereafter, the reaction mixture was rapidly cooled. During this cooling step, the fatty acid metal salt and the amide compound were added to the reaction mixture in the proportions shown in Table 1 and mixed therewith by stirring. This mixture was cooled to 80° C. Furthermore, the additives were added thereto in the proportions shown in Table 1. Finally, octyldiphenylamine was added as an antioxidant to each grease sample in an amount of 1.0% based on all ingredients other than this antioxidant. The resultant mixture was allowed to cool to about 60° C. and then treated with a homogenizer. Thus, greases were obtained.

Comparative Examples 1 to 4

Grease samples were produced according to the formulations shown in Table 2.

The method used is as follows. The base oil and the diisocyanate were charged into a closed type grease sample production apparatus. The contents were heated to 60° C. with stirring, and a raw material prepared by mixing the amines with the base oil and dissolving these was added to the contents through a hopper and reacted therewith. The reaction mixture was heated to 170° C. with stirring and held for 30 minutes to complete the reaction. Thereafter, the reaction mixture was rapidly cooled. During this cooling step, the fatty acid metal salt and/or the amide compound was added to the reaction mixture in the proportions shown in Table 2 and mixed therewith stirring. This mixture was cooled to 80° C. Furthermore, the additives were added thereto in the proportions shown in Table 2. Finally, octyldiphenylamine was added as an antioxidant to each grease sample in an amount of 1.0% based on all ingredients other than this antioxidant. The resultant mixture was allowed to cool to about 60° C. and then treated with a homogenizer. Thus, greases were obtained.

The diisocyanate used as a raw material for the diurea compounds (a) shown in Tables 1 and 2 is the compound of the following chemical structure, which has a molecular weight of 250.

[Chemical Structure-1]

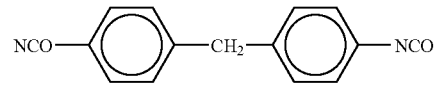

Amine A is a linear primary amine consisting mainly of (at least 90%) a saturated alkyl group with 8 carbon atoms and having an average molecular weight of 130 (industrial caprylamine).

Amine B is a linear primary amine consisting mainly of (at least 90%) a saturated alkyl group with 18 carbon atoms and having an average molecular weight of 270 (industrial stearylamine).

Amine C is a linear primary amine which contains about 50% unsaturated alkyl group with 18 carbon atoms and further contains saturated or unsaturated alkyl groups with 18-14 carbon atoms and which has an average molecular weight of 255 (industrial beef tallow amine).

Amine D is a linear primary amine consisting mainly of (at least 70%) an unsaturated alkyl group with 18 carbon atoms and having an average molecular weight of 260 (industrial oleylamine).

The fatty acid metal salts (b) are as follows.

Fatty acid metal salt A is the lithium salt of 12-hydroxystearic acid.

Fatty acid metal salt B is the lithium salt of stearic acid.
Fatty acid metal salt C is the calcium salt of stearic acid.
Fatty acid metal salt D is the aluminum salt of stearic acid.
The amide compounds (c) are as follows.
Amide A is N,N'-ethylenebisstearamide.
Amide B is stearamide.

The mineral oil shown in the Examples and Comparative Examples is one having a dynamic viscosity at 40° C. of 101.5 mm$^2$/s and a pour point of −15° C. Synthetic hydrocarbon oil A (CAS No. 68037-01-4) is one having a dynamic viscosity at 40° C. of 14.94 mm$^2$/s and a pour point of −67.7° C. Moreover, synthetic hydrocarbon oil B (CAS No. 68037-01-4) is one having a dynamic viscosity at 40° C. of 396.2 mm$^2$/s and a pour point of −36° C.

Additive A is an organomolybdenum complex, which is the oil-soluble organomolybdenum compound described in JP-B-5-66435.

Additive B is primary Zn-DTP (primary zinc dithiophosphate).

Additive C is Zn-DTC (zinc dithiocarbamate)

The Examples and Comparative Examples were evaluated for the properties shown in the Tables according to the following test methods. The tests were entrusted to K.K. SVC Tokyo.

Consistency: JIS K2220
Dropping point: JIS K2220
Oil separation: JIS K2220, method B; conditions, 100° C./24 hours.

The following were found from the results of these experiments.

(1) The electric power steering apparatus employing the lubricating greases of the invention showed stable torque characteristics in which the irregular friction fluctuations occurring on rolling/sliding friction surfaces had been considerably diminished.

(2) The electric power steering apparatus employing the lubricating greases of the invention showed stable low-torque characteristics in a wide temperature range.

(3) The electric power steering apparatus employing the lubricating greases of the invention have an exceedingly long life even at high temperatures.

Examples of the electric power steering apparatus to which the invention is to be applied include that described in JP-A-2003-335249. The constitution of this apparatus is as described in the document. As shown in the FIG. 2 of that document, the apparatus comprises, as major components, a rack shaft 15 connected to wheels and an electric motor 30 disposed so as to encircle the rack shaft 15, the rack shaft 15 having a ball screw groove 15B formed in the peripheral surface thereof. The apparatus further has a ball screw mechanism 37 comprising a ball screw nut 38 attached to one end of the motor shaft 32 of the electric motor 30. In this constitution, the ball screw mechanism 37 and bearings 33 and 34, which support both ends of the motor shaft 32, are rolling devices. Of these, the bearings 33 and 34 are rolling bearings, more particularly, ball bearings utilizing the rolling of balls.

Samples were prepared by applying each of the greases of the Examples and Comparative Examples as a lubricant to the rolling devices of that electric power steering apparatus. These samples were compared in performance by the following test methods.

1. Steering Wheel Sticking Test

When a driver manipulates a steering wheel (steers a car) and any of the rolling devices, in particular, the ball screw mechanism, of the steering apparatus comes to have a part where friction fluctuates irregularly during the steering, then a region appears where the steering torque abruptly increases during the steering and the driver has a feeling of disorder such as steering wheel sticking, i.e., an unpleasant feeling. In this test, each electric power steering apparatus was hence used to conduct a steering operation at ordinary temperature and steering torque fluctuations in this operation were measured.

Specifically, the procedure is as follows. The steering wheel was manipulated to operate the electric power steering apparatus from the left-hand steering end to the right-hand steering end and then back to the left-hand steering end, and the load torque in this operation was measured. The torque values measured were averaged (to determine the average torque). When torque peaks having torque values larger than the average torque by at least a given value were observed, the amount (protrudent torque value) by which each peak protruded from the given value was determined. The electric power steering apparatus samples were evaluated (relative evaluation) by comparing these in the number of peaks having a protrudent torque value (frequency of protrudent-torque peaks). The greases of Examples 1 to 4 gave results showing that they each had been stably low in the frequency of protrudent-torque peaks as compared with Comparative Examples 2 and 3.

Consequently, when the greases of the Examples are used in a rolling device, especially in a ball screw mechanism, the rolling device in a machine tool or the like is expected to work stably and smoothly. In the electric power steering apparatus employing this rolling device, the driver who manipulates the steering wheel (steers the car) has almost no feeling of disorder such as steering wheel sticking and has a smooth and comfortable steering feeling.

2. Low- to Ordinary-Temperature Performance Test

When the grease increases in viscosity in a low-temperature region, the preload imposed on the rolling device, especially the ball screw mechanism, increases and this may impair the steering feeling (steering becomes heavy and, in particular, the so-called "steering wheel return" becomes poor). In order to examine this phenomenon, electric power steering apparatus having rolling devices employing the greases of the Examples and Comparative Examples were evaluated in the following manner. Each electric power steering apparatus was regulated so as not to operate the electric motor, i.e., so as to be in the state of giving no power assist. Under these conditions, the steering torque required for rotating the steering wheel by a given angle was measured. The electric power steering apparatus were evaluated by comparing these in the found value of the torque (preload).

As a result, the greases of Examples 1 to 4 showed satisfactory performance in the range of from ordinary temperature (25° C.) to a low temperature (−20° C.) as compared with the grease of Comparative Example 4. Consequently, by applying the greases of the Examples to a rolling device, especially to a ball screw mechanism, a rolling device showing stable low-torque characteristics is obtained. Furthermore, the electric power steering apparatus employing this rolling device gives a satisfactory steering feeling even when the apparatus has not been warmed up just after engine starting or even in an extremely cold district. In particular, the so-called "steering wheel return" occurs smoothly. Thus, the superiority of the greases of the Examples is exhibited.

3. Durability Test

When the grease decreases in viscosity in a high-temperature region, there are cases where the rolling device comes into the state in which the oil film to be formed from the grease has almost disappeared (oil film deficiency). An oil film deficiency can occur also as a result of grease deterioration or consumption due to long-term use. This oil film deficiency not only inhibits smooth lubrication in the rolling device to impair the steering feeling, but also may cause seizing (sticking). When seizing occurs, this, in the worst case, may result in breakage of the rolling device. In order to examine this phenomenon, durability was examined in this test under conditions similar to those in practical use.

Specifically, the procedure is as follows. Each lubricating grease was charged into the rolling parts of the electric power steering apparatus shown in JP-A-2003-335249. A normal-rotation operation and reverse-rotation operation were repeatedly conducted 120,000 times while imposing a given load not lower than those in practical use. The apparatus was examined for any change in working state. Furthermore, after the test, the bearings and ball screw mechanism were examined for surface state and damages/mars, and the state of the grease was examined. The electric power steering apparatus were evaluated by comparing these in durability.

As a result, it was found that satisfactory durability is obtained by using the greases of Examples 1 to 4. Consequently, when the greases of the invention are applied to a rolling device and an electric power steering apparatus, the rolling device and electric power steering apparatus obtained are less apt to suffer an oil film deficiency, seizing, etc. and can retain high reliability throughout long-term use.

TABLE 1

| Example | 1 | 2 | 3 | 4 |
|---|---|---|---|---|
| (a) Diurea compounds | | | | |
| Diisocyanate (molar proportion) | 1.0 | 1.0 | 1.0 | 1.0 |
| Amine A (molar proportion) | 1.0 | 0.75 | 1.0 | 0.75 |
| Amine B (molar proportion) | 0.25 | 0.25 | — | — |
| Amine C (molar proportion) | — | 0.75 | 1.0 | — |
| Amine D (molar proportion) | 0.75 | 0.25 | — | 1.25 |
| Average molecular weight of diurea compounds (mole, MW) | 642.5 | 673.0 | 635.0 | 676.3 |
| Proportion of unsaturated components to linear hydrocarbon groups of diurea compounds (mol %) | 35.3 | 27.2 | 29.7 | 56.9 |
| Total amine value of amines as raw material, mg-KOH/g | 289.1 | 265.7 | 291.6 | 264.6 |
| Amount of ingredient a (%) | 5.0 | 5.0 | 8.0 | 11.0 |
| (b) Fatty acid metal salts (%) | | | | |
| Fatty acid salt A | 4.5 | — | — | — |
| Fatty acid salt B | — | 4.0 | — | — |
| Fatty acid salt C | — | — | — | 2.0 |
| Fatty acid salt D | — | — | 3.5 | — |
| (c) Amide compounds (%) | | | | |
| Amide A | 3.5 | 2.0 | — | 2.0 |
| Amide B | — | — | 3.5 | — |
| Total amount of ingredients b and c (%) | 8.0 | 6.0 | 7.0 | 4.0 |
| Proportion of ingredient a | 1.43 | 2.5 | 4.57 | 8.25 |
| Proportion of ingredient b | 1.26 | 2.0 | 2.0 | 1.5 |
| Proportion of ingredient c | 1.0 | 1.0 | 2.0 | 1.5 |
| Ratio of proportion of a to proportion of b and c; a/(b + c) | 0.625 | 0.833 | 1.143 | 2.75 |
| Amount of thickener (a + b + c) (%) | 13.0 | 11.0 | 15.0 | 15.0 |
| Mineral oil (%) | 8.75 | 5.0 | — | — |
| Synthetic hydrocarbon oil A (%) | 75.0 | 74.5 | 76.0 | 81.0 |
| Synthetic hydrocarbon oil B (%) | — | 5.0 | 5.0 | — |
| Additive A (%) | 1.25 | 2.0 | 2.0 | 1.5 |
| Additive B (%) | 0.75 | 1.0 | 1.0 | 1.0 |
| Additive C (%) | 0.75 | 1.0 | 0.7 | 1.0 |
| Additive D (%) | 0.50 | 0.5 | 0.3 | 0.5 |
| Total additive amount (%) | 3.25 | 4.5 | 4.0 | 4.0 |
| Consistency | 311 | 322 | 295 | 255 |
| Dropping point (° C.) | 213 | 211 | 232 | 230 |
| Oil separation (mass %) | 0.35 | 0.36 | 0.32 | 0.29 |
| Dynamic viscosity of base oil, 40° C., mm$^2$/s | 15.69 | 18.39 | 18.00 | 14.94 |
| Pour point of base oil (° C) | −56.9 | −52.3 | −61.5 | −67.7 |

TABLE 1-continued

| Example | 1 | 2 | 3 | 4 |
|---|---|---|---|---|
| [Bench Test of Electric Power Steering] | | | | |
| 1. Steering wheel sticking test | | | | |
| Frequency of protrudent-torque peaks (ratio to the value for Comparative Example 3, which was taken as 1.0) | 0.51 | 0.63 | 0.57 | 0.73 |
| 2. Low- to ordinary-temperature performance test (preload) (ratio to the preload for Comparative Example 3 at −20° C., which was taken as 1.0) | | | | |
| −20° C. | 1.07 | 1.11 | 0.88 | 0.84 |
| 25° C. | 0.25 | 0.23 | 0.22 | 0.25 |
| 3. Durability test in 120,000-time operation | normal | normal | normal | normal |

TABLE 2

| Comparative Example | 1 | 2 | 3 | 4 |
|---|---|---|---|---|
| (a) Diurea compounds | | | | |
| Diisocyanate (molar proportion) | 1.0 | 1.0 | 1.0 | 1.0 |
| Amine A (molar proportion) | 0.75 | 0.75 | 0.75 | 0.25 |
| Amine B (molar proportion) | 0.25 | 0.25 | 0.25 | — |
| Amine C (molar proportion) | 0.75 | 0.75 | 0.75 | — |
| Amine D (molar proportion) | 0.25 | 0.25 | 0.25 | 1.75 |
| Average molecular weight of diurea compounds (mole, MW) | 673.0 | 673.0 | 673.0 | 743.7 |
| Proportion of unsaturated components to linear hydrocarbon groups of diurea compounds (mol %) | 27.2 | 27.2 | 27.2 | 69.4 |
| Total amine value of amines as raw material, mg-KOH/g | 265.7 | 265.7 | 265.7 | 228.8 |
| Amount of ingredient a (%) | 7.0 | 9.0 | 9.0 | 6.5 |
| (b) Fatty acid metal salts (%) | | | | |
| Fatty acid salt A | — | — | 0.25 | — |
| Fatty acid salt B | 6.0 | — | — | — |
| Fatty acid salt C | — | — | — | 3.5 |
| Fatty acid salt D | — | — | — | — |
| (c) Amide compounds (%) | | | | |
| Amide A | — | — | 0.25 | — |
| Amide B | — | — | — | 3.5 |
| Total amount of ingredients b and c (%) | 6.0 | — | 0.5 | 7.0 |
| Proportion of ingredient a | 1.0 | — | 10 | 3.71 |
| Proportion of ingredient b | 0.85 | — | 0.28 | 2.0 |
| Proportion of ingredient c | 0 | — | 0.28 | 2.0 |
| Ratio of proportion of a to proportion of b and c; a/(b + c) | 1.17 | — | 18.0 | 2.67 |
| Amount of thickener (a + b + c) (%) | 13.0 | 9.0 | 9.5 | 11.0 |
| Mineral oil (%) | — | — | — | 35.3 |
| Synthetic hydrocarbon oil A (%) | 82.5 | 83.0 | 81.0 | — |
| Synthetic hydrocarbon oil B (%) | — | — | 5.0 | 52.9 |
| Additive A (%) | 2.0 | 2.0 | 2.0 | 0.2 |
| Additive B (%) | 1.0 | 1.0 | 1.0 | 0.2 |
| Additive C (%) | 1.0 | 1.0 | 1.0 | 0.2 |
| Additive D (%) | 0.5 | 0.5 | 0.5 | 0.2 |
| Total additive amount (%) | 4.5 | 4.5 | 4.5 | 0.8 |
| Consistency | 279 | 283 | 278 | 274 |
| Dropping point (° C.) | 228 | 226 | 230 | 189 |
| Oil separation (mass %) | 0.33 | 0.31 | 0.30 | 0.36 |
| Dynamic viscosity of base oil, 40° C., mm$^2$/s | 14.94 | 14.94 | 17.81 | 263.1 |
| Pour point of base oil (° C.) | −67.7 | −67.7 | −62.8 | −21.0 |

TABLE 2-continued

| Comparative Example | 1 | 2 | 3 | 4 |
|---|---|---|---|---|
| [Bench Test of Electric Power Steering] | | | | |
| 1. Steering wheel sticking test Frequency of protrudent-torque peaks (ratio to the value for Comparative Example 3, which was taken as 1.0) | 0.84 | 1.22 | 1.0 | 0.80 |
| 2. Low- to ordinary-temperature performance test (preload) (ratio to the preload for Comparative Example 3 at -20° C., which was taken as 1.0) | | | | |
| -20° C. | 0.94 | 0.82 | 1.0 | 2.36 |
| 25° C. | 0.28 | 0.22 | 0.24 | 0.35 |
| 3. Durability test in 120,000-time operation | flaking occurred in 60,000 times | normal | normal | flaking occurred in 60,000 times |

While the invention has been described in detail and with reference to specific embodiments thereof, it will be apparent to one skilled in the art that various changes and modifications can be made therein without departing from the spirit and scope thereof.

This application is based on a Japanese patent application filed on Apr. 28, 2005 (Application No. 2005-131702), the contents thereof being herein incorporated by reference.

The invention claimed is:

1. A rolling device characterized by employing a lubricating grease composition comprising:
a thickener which is a mixed thickener comprising a mixture of (a), (b) and (c):
(a) one or more diurea compounds which are one or more aliphatic diurea compounds having an average molecular weight of 635-676.3 in which 27.2-56.9% by mole of the linear hydrocarbon groups are unsaturated components, the aliphatic diurea compounds having been produced using as a raw material one or more primary amines selected from the group consisting of capryl amine, stearyl amine, beef tallow amine and oleyl amine, with a diisocyanate of the following formula:

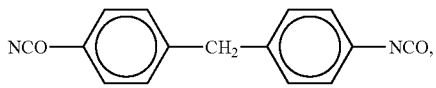

(b) at least one of a lithium, calcium and aluminum fatty acid metal salt of at least one selected from the group consisting of 12-hydroxystearic acid and stearic acid, and
(c) at least one amide compound selected from the group consisting of aliphatic N,N'-ethylene bisstearamide and stearamide,
the proportions of (a) and of (b) and (c) satisfying the relationship:

$a/(b+c)=0.625-2.75$ provided that
(1) the proportion of ingredient (a) is 1.43-8.25,
(2) the proportion of ingredient (b) is 1.26-2.0, and
(3) the proportion of ingredient (c) is 1.0-2.0,
the amount of the thickener being 11.0 to 15% by weight, based on the lubricating grease composition;
(d) a base oil which is a lube base oil having a pour point of -36 to -67.7° C. and comprising a synthetic hydrocarbon oil as the main component; and
(e) an additive which is a mixture comprising an organomolybdenum complex, an organozinc compound of a dithiocarbamic acid, and an organozinc compound of dithiophosphoric acid, the amount of the additive being 3.25-4.5% by weight, based on the lubricating grease composition.

2. The rolling device according to claim 1, characterized in that the rolling device is a ball screw mechanism.

3. The rolling device according to claim 1, characterized in that the rolling device is a rolling bearing.

4. The rolling device according to claim 3, characterized in that the rolling bearing is a ball bearing which utilizes the rolling of balls.

5. An electric power steering apparatus characterized by employing the rolling device of claim 1.

6. A lubricating grease composition, comprising:
a thickener comprising a mixture of (a), (b) and (c):
(a) one or more diurea compounds having an average molecular weight of 635-676.3, wherein the diurea compounds are aliphatic diurea compounds in which 27.2-56.9% by mol of the linear hydrocarbon groups are unsaturated components, wherein the diurea compounds are obtained in a process that includes reacting one or more primary amines selected from the group consisting of capryl amine, stearyl amine, beef tallow amine and oleyl amine, with a diisocyanate of the following formula:

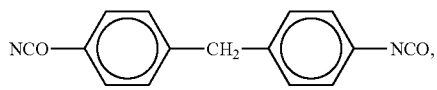

(b) at least one of a lithium, calcium and aluminum fatty acid salt of at least one selected from the group consisting of 12-hydroxystearic acid and stearic acid, and
(c) at least one of an aliphatic amide compound selected from the group consisting of N,N'-ethylene bisstearamide and stearamide,
wherein the proportions of components (a), (b), and (c) of the thickener satisfy the following relationship:

$a/(b+c)=0.625-2.75$ wherein (1) the proportion of (a) is 1.43-8.25,
(2) the proportion of ingredient (b) is 1.26-2.0, and
(3) the proportion of (c) is 1.0-2.0,
wherein the thickener is present in the lubricating grease composition in an amount from 11.0 to 15% by weight based on the total weight of the lubricating grease composition;
(d) a lube base oil having a pour point of −36 to −67.7° C., wherein the lube base oil comprises a synthetic hydrocarbon oil as a main component;
(e) an additive mixture comprising an organomolybdenum complex, an organo zinc compound of a dithiocarbamic acid, and an organo zinc compound of dithiophosphoric acid, wherein the amount of the additive mixture is from 3.25-4.5% by weight based on the total weight of the lubricating grease composition.

7. A method for lubricating a rolling device, comprising: applying the grease of claim 6 to the rolling device.

8. The rolling device of claim 1, wherein the diurea compound comprises reacted units of each of capryl amine, stearyl amine, beef tallow amine and oleyl amine.

9. The lubricating grease composition of claim 6, wherein the diurea compound comprises reacted units of each of capryl amine, stearyl amine, beef tallow amine and oleyl amine.

10. The rolling device of claim 1, wherein the fatty acid metal salt is a lithium salt of 12 hydroxy stearic acid.

11. The lubricating grease composition of claim 6, wherein the fatty acid metal salt is a lithium salt of 12 hydroxy stearic acid.

12. The rolling device of claim 1, wherein the base oil has a pour point of from −52.3 to −67.7° C.

13. The lubricating grease composition of claim 6, wherein the base oil has a pour point of from −52.3 to −67.7° C.

14. The rolling device of claim 1, wherein the lubricating grease composition has a dropping point of 211-230° C. and a consistency of 255-322.

15. The lubricating grease composition of claim 6, having a dropping point of 211-232° C. and a consistency of 255-322.

* * * * *